(12) United States Patent
Yagi (10) Patent No.: US 8,071,493 B2
(45) Date of Patent: Dec. 6, 2011

(54) CRYSTALLIZED GLASS

(75) Inventor: Toshitaka Yagi, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 0 days.

(21) Appl. No.: 12/262,535

(22) Filed: Oct. 31, 2008

(65) Prior Publication Data

US 2009/0118113 A1    May 7, 2009

(30) Foreign Application Priority Data

Nov. 2, 2007    (JP) ................................. 2007-286433

(51) Int. Cl.
*C03C 10/04* (2006.01)
*C03C 10/14* (2006.01)

(52) U.S. Cl. .............. 501/5; 501/4; 428/410; 428/846.9
(58) Field of Classification Search .................. 501/4, 5, 501/7; 428/846.9, 410
See application file for complete search history.

(56) References Cited

U.S. PATENT DOCUMENTS

| | | | |
|---|---|---|---|
| 5,691,256 A * | 11/1997 | Taguchi et al. | 501/63 |
| 5,804,520 A | 9/1998 | Morinaga et al. | |
| 5,874,376 A * | 2/1999 | Taguchi et al. | 501/63 |
| 5,972,816 A * | 10/1999 | Goto | 501/4 |
| 6,124,223 A * | 9/2000 | Beall et al. | 501/4 |
| 6,294,490 B1 * | 9/2001 | Zou et al. | 501/9 |
| 6,376,402 B1 * | 4/2002 | Pannhorst et al. | 501/66 |
| 6,383,645 B1 * | 5/2002 | Goto et al. | 428/426 |
| 6,387,509 B1 * | 5/2002 | Goto et al. | 428/426 |
| 6,410,466 B1 | 6/2002 | Goto et al. | |
| 6,426,311 B1 | 7/2002 | Goto et al. | |
| 6,560,049 B2 | 5/2003 | Goto et al. | |
| 6,627,565 B1 | 9/2003 | Zou et al. | |
| 6,627,566 B1 | 9/2003 | Zou | |
| 6,677,259 B2 | 1/2004 | Goto et al. | |
| 6,905,988 B2 | 6/2005 | Zou | |
| 6,960,399 B2 | 11/2005 | Zou et al. | |
| 7,015,161 B2 | 3/2006 | Zou | |
| 7,208,238 B2 * | 4/2007 | Ikenishi et al. | 428/846.9 |
| 7,220,690 B2 * | 5/2007 | Mitra et al. | 501/4 |
| 7,226,881 B2 * | 6/2007 | Goto | 501/4 |
| 7,264,894 B2 | 9/2007 | Zou et al. | |
| 7,645,714 B2 * | 1/2010 | Kawashima et al. | 501/4 |
| 7,665,330 B2 * | 2/2010 | Nakajima | 65/33.8 |
| 7,678,720 B2 * | 3/2010 | Nakajima | 501/4 |
| 2002/0115550 A1 | 8/2002 | Kawai et al. | |
| 2007/0149379 A1 | 6/2007 | Hsu et al. | |

FOREIGN PATENT DOCUMENTS

| | | | |
|---|---|---|---|
| JP | 01308845 | * | 12/1989 |
| JP | 04331743 | * | 11/1992 |
| JP | 2001-048584 A | | 2/2001 |
| JP | 2001-184624 A | | 7/2001 |
| JP | 2002-145639 A | | 5/2002 |
| JP | 2002-145641 A | | 5/2002 |

OTHER PUBLICATIONS

Japanese Office Action dated Nov. 5, 2009 issued in corresponding Japanese Patent Application No. 2007-286433.
Japanese Office Action dated Feb. 9, 2011 issued in corresponding Japanese Patent Application No. 2007-286433.
Malaysian Office Action dated Jun. 15, 2011, issued in Malaysian Patent Application No. PI 20084260.

* cited by examiner

*Primary Examiner* — Karl Group
(74) *Attorney, Agent, or Firm* — Westerman, Hattori, Daniels & Adrian, LLP (57) ABSTRACT

In all of an in-plane magnetic recording system and a perpendicular magnetic recording system, there is provided a crystallized glass for a disk substrate for information recording medium, etc., which has satisfactory surface properties capable of sufficiently adapting with a lamp loading system for high-density recording, has high strength such that it is able to withstand high-speed rotation and impact, has heat expansion properties and heat resistance in agreement with respective drive members, has a low melting temperature, has excellent productivity and is reduced in the elution amount of an alkali from the raw material, namely excellent in chemical durability. The crystallized glass of the invention is a crystallized glass containing an $SiO_2$ component and an $Li_2O$ component; further containing at least one member selected from an SrO component and a BaO component in a total content of more than 3.5% and not more than 15% in terms of % by mass; and containing at least one member selected among lithium disilicate, lithium monosilicate, $\alpha$-quartz, an $\alpha$-quartz solid solution and a $\beta$-quartz solid solution as a main crystal phase on the oxide basis.

15 Claims, 3 Drawing Sheets

CRYSTALLIZED GLASS

CROSS REFERENCES TO RELATED APPLICATIONS

The present invention contains subject matter related to Japanese Patent Application No. 2007-286433 filed with the Japan Patent Office on Nov. 2, 2007, the entire contents of which being incorporated herein by reference.

BACKGROUND OF THE INVENTION

1. Field of the Invention

The present invention relates to a crystallized glass and in particular, to a crystallized glass for information magnetic recording medium substrate. In particular, in substrates for magnetic recording medium to be used in various information magnetic recording units, especially perpendicular magnetic recording media, media for patterned media, discrete track media, etc., the invention provides a crystallized glass having a reduced content of an alkali metal for the purpose of suppressing a lowering of magnetic properties of a recording medium or reducing a defect to be caused due to alkali corrosion, having low viscosity properties adaptive with press molding on a mass production level, having an extremely smooth substrate surface adaptive with a low flying height of a magnetic head, having high Young's modulus and low specific gravity properties and having excellent mechanical properties.

The "information recording medium" as referred to in the invention means an information magnetic recording medium which can be used in, for example, a fixed hard disk, a removal hard disk or a card type hard disk which is used as a hard disk of a personal computer; a hard disk for digital video camera, digital camera or audio; a hard disk for satellite navigation system, a hard disk for cellular phone; or a hard disk for various electron devices.

2. Description of the Related Art

In recent years, for the purposes of conforming with an multimedia application of a personal computer and dealing with large data such as motion videos and voices by a digital video camera or a digital camera, an information magnetic recording unit with large capacity becomes necessary. As a result, in the information magnetic recording medium, in order to increase the areal recording density, there is a tendency that the bit or track density is increased and that the size of a bit cell is reduced. For that reason, a magnetic head must be worked more closely to the disk surface than that which has been adopted so far.

Furthermore, when the recording density exceeds 100 $Gb/in^2$, such a small magnetic domain becomes thermally instable. Therefore, an in-plane recording system reaches a physical limit against a demand of high recording density exceeding 100 $Gb/in^2$.

In order to adapt with this matter, adaptation and mass production of a perpendicular magnetic recording system are being advanced. In this perpendicular magnetic recording system, since the axis of easy magnetization is a perpendicular direction, it is possible to make the bit size extremely small. Also, since the medium has a desired film thickness (from 5 to 10 times that in the in-plane recording system), a reduction of demagnetizing field and an effect due to shape magnetic anisotropy can be desired. Therefore, problems to be caused in high density of the existing magnetic recording system in an in-plane direction, including a reduction of recording energy and thermal instability, can be solved, and as compared with the in-plane magnetic recording system, a remarkable enhancement in recording density can be realized. In view of these matters, in the perpendicular magnetic recording system, it has already become possible on a mass production level to attain a recording density of 100 $Gb/in^2$ or more on a practical use level, and studies regarding the recording density exceeding 300 $Gb/in^2$ are already performed.

In this perpendicular magnetic recording system, since the magnetization is performed in a perpendicular direction to the medium surface, different from existing media having an axis of easy magnetization in the in-plane direction, a medium having an axis of easy magnetization in the perpendicular direction is used. As the recording layer of the perpendicular magnetic recording system which is studied and put into practical use, there are exemplified various alloy films, for example, a barium ferrite film, a $Co$-$\gamma Fe_2O_3$ or Co based alloy, an Fe based alloy such as FePt, an Ni based alloy, etc.

Now, in such a magnetic recording medium, in order to achieve refinement and formation in a perpendicular direction of a magnetic crystal particle, it is required to increase the fabrication temperature. Furthermore, according to recent studies, there is the case where annealing is carried out at a high temperature (from about 500 to 900° C.) for the purpose of enhancing the magnetic properties.

In order to adapt with this matter, the substrate is required such that the material shape hardly changes before and after the annealing treatment and that it is excellent in heat resistance. Also, following the high density, in order to make it possible to attain a low flying height of a magnetic head, an extremely smooth surface smoothness is considered to be necessary.

In addition, in order to make it possible to continuously use a magnetic recording medium over a long period of time, basic problems to be caused due to the elution of an alkali from the substrate, such as (a) a lowering in magnetic properties of the recording medium (the alkali component diffuses into the recording medium, thereby lowering magnetic properties of the medium) and (b) deposition of a defect onto the substrate surface (the eluted alkali component diffuses into the surface of the recording medium to become a compound, which is then formed as a foreign matter on the surface), must be solved.

The former phenomenon is described in more detail. First of all, with respect to the alkali elution phenomenon, in case of manufacturing a crystallized glass which requires an alkali component as a constitutional component of a crystal phase, the concentration of the alkali component of a raw glass must be made higher than the stoichiometric amount necessary in the crystal phase, and after the crystallization, the alkali component which has not been consumed remains in the glass matrix phase. According to this, the matters that (i) the remaining alkali component thermally diffuses into the recording medium during the fabrication to form a compound together with the components of the recording medium, thereby lowering magnetic properties of the recording medium; and that (ii) the remaining alkali component diffuses with time into the surface of the recording medium and combines with water or a carbon dioxide gas on the surface to form a hydroxide or a carbonate, and this compound becomes a foreign material on the surface, thereby causing surface deficiency or recording jump occur.

In the light of the above, on these days in which the recording density is tremendously increased, the foregoing problems are one of the factors of disturbing the enhancement of recording density. Accordingly, much more than so far, a substrate with less alkali elution, especially a substrate having a low content of a lithium ion with a smaller ion radius which is a main cause of the generation of alkali corrosion is eagerly demanded.

As an application of the substrate for information recording medium, several crystallized glasses are known. For example, an $SiO_2$—$Li_2O$—$P_2O_5$ based crystallized glass disclosed in JP-A-2000-302481 has lithium disilicate ($Li_2O.2SiO_2$) and α-quartz as a main crystal phase and is a material exhibiting excellent physical properties as the information magnetic recording medium. However, since the amount of an alkali component is relatively high, a problem of the generation of damaging a magnetic film to be caused due to a lithium ion deposited from an end surface of the substrate after fabrication cannot be connived. Also, the surface roughness of the substrate cannot be reduced (<3 angstroms) so that it cannot be adapted with high-density recording.

An $Li_2O$—$Al_2O_3$—$SiO_2$ based crystallized glass disclosed in JP-A-2000-184624 has lithium disilicate ($Li_2O.2SiO_2$) as a main crystal phase, has a low $Li_2O$ content as from 4% by mass to 8% by mass and is a material exhibiting excellent physical properties as the information magnetic recording medium. However, for the purpose of minimizing the deposition of a lithium ion, the content of the $Li_2O$ component is merely made low, and therefore, the viscosity at the time of melting the raw glass becomes high. Thus, it is not suitable for press molding.

An $Li_2O$—$Al_2O_3$—$SiO_2$ based crystallized glass disclosed in JP-A-2001-48584 is a crystallized glass for optical filter containing lithium disilicate ($Li_2O.2SiO_2$) and at least one member selected among α-quartz, an α-quartz solid solution, α-cristobalite and an α-cristobalite solid solution as a main crystal phase. However, it has a high viscosity at the time of melting the raw glass and is hardly press molded into a thin sheet, and therefore, it is not suitable for an application of information recording medium.

SUMMARY OF THE INVENTION

An object of the invention is to provide a crystallized glass for a disk substrate for information recording medium, etc., which has satisfactory surface properties capable of sufficiently adapting with even a perpendicular magnetic recording system while reducing the content of an alkali component for the purpose of suppressing a lowering of magnetic properties of a recording medium or reducing a defect to be caused due to elution of the alkali component, has high strength such that it is able to withstand high-speed rotation and drop impact, has heat expansion properties and chemical durability in agreement with respective drive members, has a low melting temperature and has high productivity suitable for press molding, etc.

In order to attain the foregoing object, the present inventor made extensive and intensive investigations. As a result, it has been found that a crystallized glass containing an $SiO_2$ component and an $Li_2O$ component, further containing at least one member selected from an SrO component and a BaO component, with a total content of at least one member selected from an SrO component and a BaO component being more than 3.5% and not more than 15% in terms of % by mass, and containing at least one member selected among lithium disilicate, lithium monosilicate, α-quartz, an α-quartz solid solution and a β-quartz solid solution as a main crystal phase on the oxide basis is low in melting temperature and viscosity of glass; when provided for an application of information recording medium, is suitable for press molding, etc.; and is excellent in mechanical properties. In addition, it has been found that the foregoing crystallized glass has an extremely smooth substrate surface adaptive with a low flying height of a magnetic head and has high Young's modulus adaptive with high-speed rotation and low specific gravity properties.

More specifically, the invention provides the following.

(1) A crystallized glass containing an $SiO_2$ component and an $Li_2O$ component on the oxide basis; further containing at least one member selected from an SrO component and a BaO component in a total content of more than 3.5% and not more than 15% in terms of % by mass on the oxide basis; and containing at least one member selected among lithium disilicate, lithium monosilicate, α-quartz, an α-quartz solid solution and a β-quartz solid solution as a main crystal phase.

(2) The crystallized glass as set forth above in (1), wherein the total amount of at least one member of an $Li_2O$ component, an $Na_2O$ component and a $K_2O$ component is from 5% to 14% in terms of % by mass on the oxide basis.

(3) The crystallized glass as set forth above in (1) or (2), wherein the content of the $Li_2O$ component is from 5% to 10% in terms of % by mass on the oxide basis.

(4) The crystallized glass as set forth above in any one of (1) to (3), wherein when dipped in pure water kept at 30° C. for 3 hours, an elution amount of an alkali component is not more than 0.016 [$\mu g/cm^2$].

(5) The crystallized glass as set forth above in any one of (1) to (4), wherein an average coefficient of linear expansion in a temperature range of from 25° C. to 100° C. is from 50 to 120 [$10^{-7}$ $C.^{-1}$].

(6) The crystallized glass as set forth above in any one of (1) to (5), wherein the crystal phase has an average particle size of not more than 100 nm.

(7) The crystallized glass as set forth above in any one of (1) to (6), wherein a Young's modulus is 85 GPa or more.

(8) The crystallized glass as set forth above in any one of (1) to (7), wherein a composition of the crystallized glass contains respective components of from 60 to 78% of $SiO_2$ and from 5 to 10% of $Li_2O$ and from 1.5 to 3.0% of $P_2O_5$ and from 4 to 10% of $Al_2O_3$ in terms of % by mass on the oxide basis.

(9) The crystallized glass as set forth above in (8), wherein the composition of the crystallized glass contains respective components of from 0 to 15% of BaO and/or from 0 to 15% of SrO and/or from 0 to 2% of MgO and/or from 0 to 2% of CaO and/or 0 to 3% of ZnO and/or from 0 to 3% of $K_2O$ and/or from 0 to 3% of $Na_2O$ and/or from 1 to 10% of $ZrO_2$ and/or from 0 to 15% in total of at least one member of a $Gd_2O_3$ component, an $La_2O_3$ component, a $Y_2O_3$ component and a $Ga_2O_3$ component and/or from 0 to 2% of an $Sb_2O_3$ component in terms of % by mass on the oxide basis.

(10) The crystallized glass as set forth above in (9), wherein the composition of the crystallized glass contains respective components of from 0 to 5% of $B_2O_3$ and/or from 0 to 5% of $TiO_2$ in terms of % by mass on the oxide basis.

(11) The crystallized glass as set forth above in any one of (1) to (10), wherein a logarithm log η of a viscosity η [dPa·s] of a molten glass when heated at 1,400° C. is not more than 2.4.

(12) A substrate for information recording medium using the crystallized glass as set forth above in any one of (1) to (11).

(13) A substrate for information recording medium having a compression stress layer on the surface of the substrate as set forth above in (12).

(14) The substrate for information recording medium as set forth above in (13), wherein the compression stress layer is formed by substituting with an alkali component having a larger ion radius than an alkali component existing in the surface layer.

(15) The substrate for information recording medium as set forth above in (13) or (14), wherein the compression stress layer is formed by heating the substrate and then quenching it.
(16) The substrate for information recording medium as set forth above in any one of (12) to (15), wherein a surface roughness Ra (arithmetic average roughness) is not more than 2 angstroms.
(17) An information recording medium using the substrate for information recording medium as set forth above in any one of (12) to (16).

The crystallized glass of the invention is low in an elution amount of an alkali component, is low in melting temperature and viscosity of glass, and in particular, when provided for an application of information recording medium, is suitable for press molding, etc. Therefore, the crystallized glass of the invention is enhanced in productivity, thereby contributing to a reduction of manufacturing costs. Also, the substrate obtainable from the crystallized glass of the invention is excellent in mechanical properties such as Young's modulus and ring flexural strength, excellent in surface roughness after polishing and especially suitable for information recording media. In addition, the substrate obtainable from the crystallized glass of the invention has properties suitable for media requiring perpendicularly magnetized films or other high-temperature fabrication capable of realizing high recording density in the future.

DESCRIPTION OF THE PREFERRED EMBODIMENTS

Figure 1:
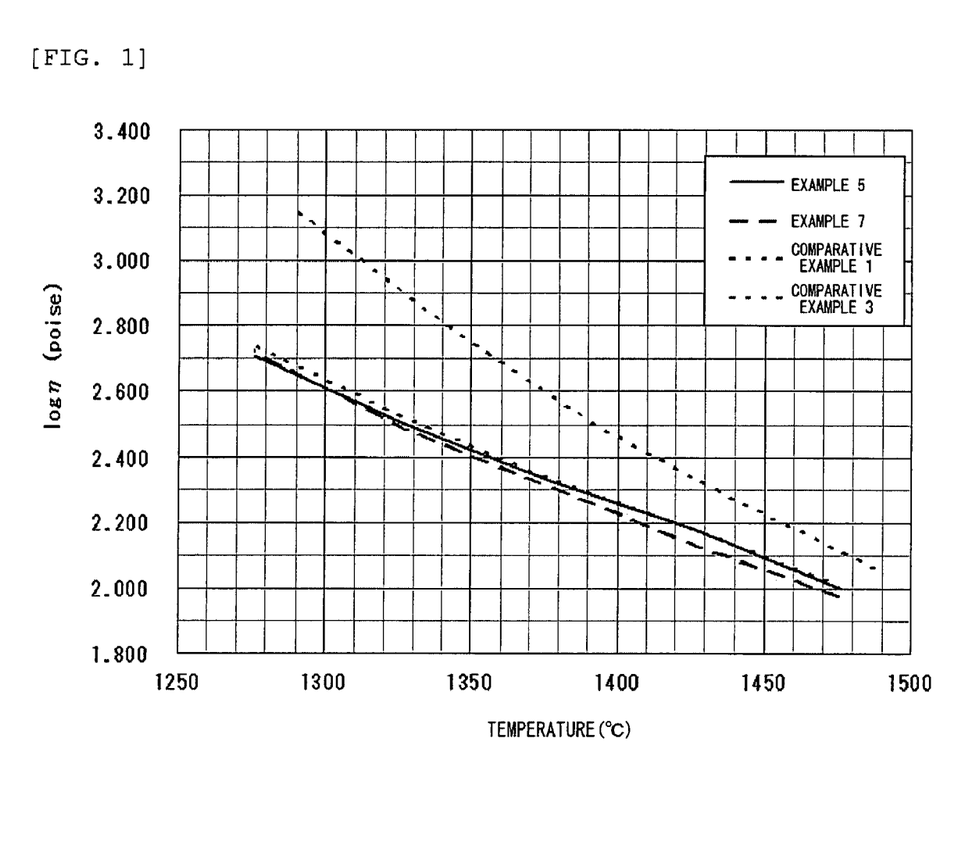
FIG. 1 shows the relationship between a logarithm ($\log \eta$) of a viscosity $\eta$ [dPa·s] of Examples (Nos. 5 and 7) and Comparative Examples (Nos. 1 and 3) of the crystallized glass of the invention and a temperature. The temperature in FIG. 1 shows a temperature of a platinum crucible filled with a glass melt in the measurement of viscosity.
Figure 2:
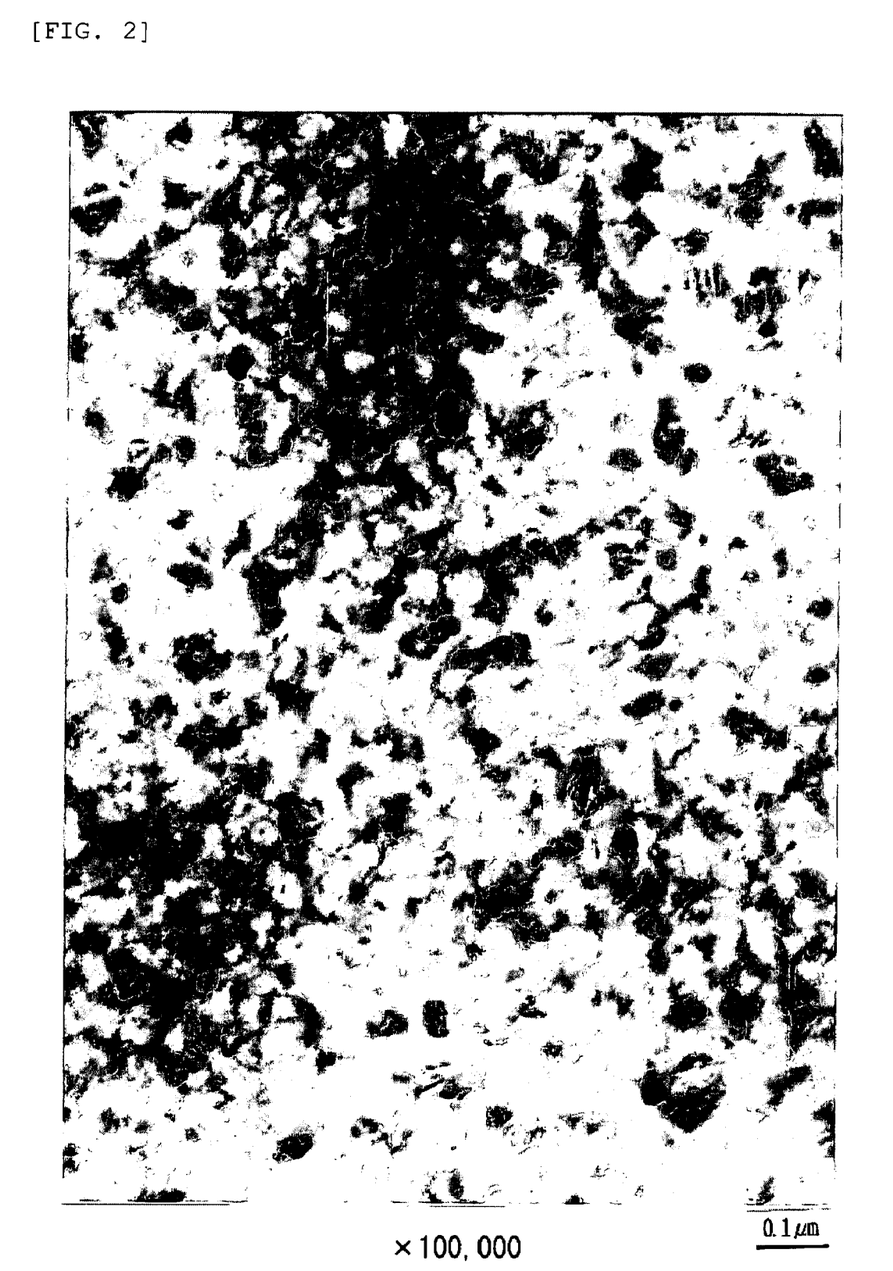
FIG. 2 shows a TEM photographic image (×100,000) of Example (No. 5) of the crystallized glass of the invention.
Figure 3:
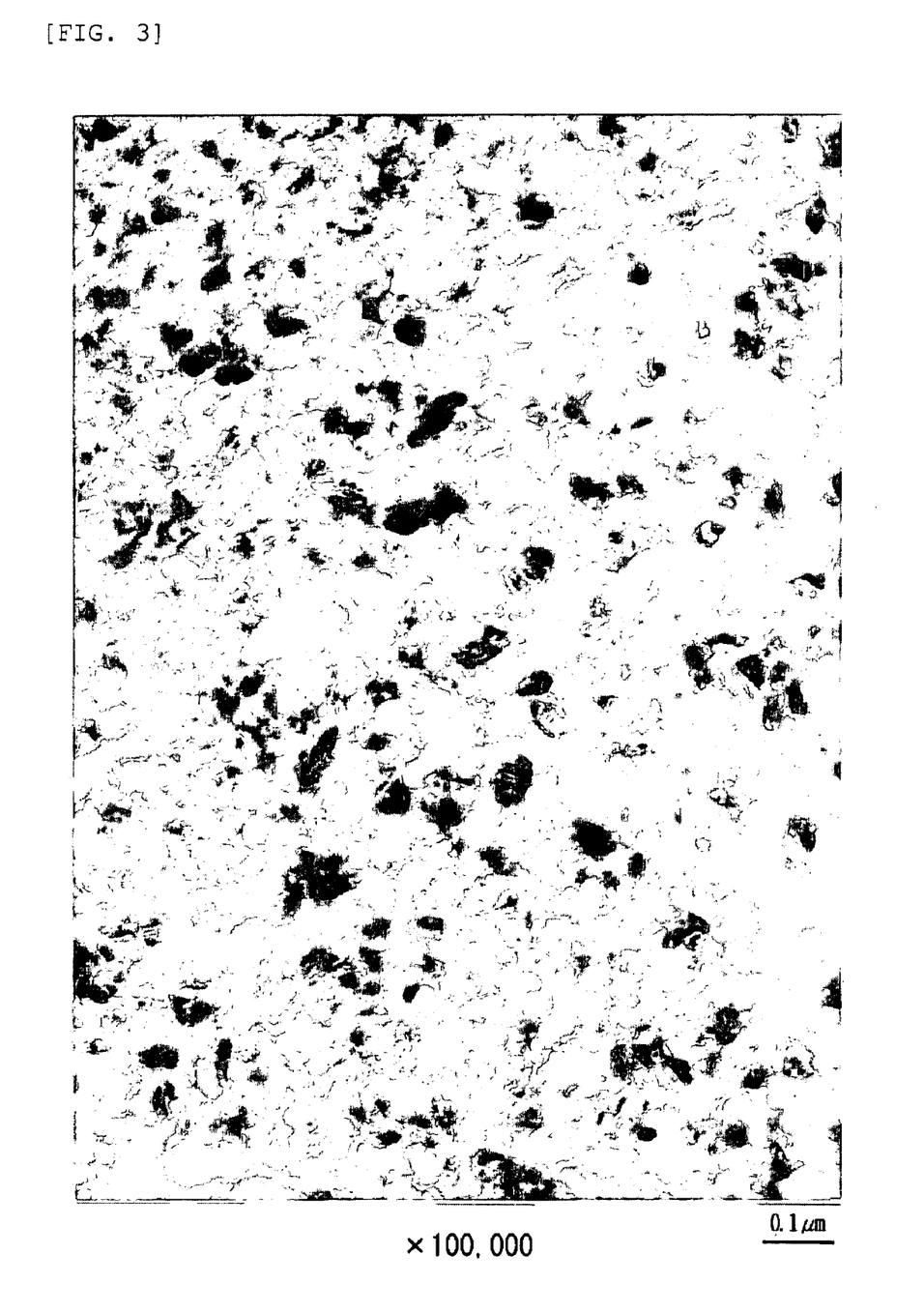
FIG. 3 shows a TEM photographic image (×100,000) of Example (No. 7) of the crystallized glass of the invention.

Next, the invention is described with reference to specific embodiments.

The crystallized glass of the invention contains at least one member selected among lithium disilicate, lithium monosilicate, α-quartz, an α-quartz solid solution and a β-quartz solid solution as a main crystal phase. By containing such a crystal phase, the crystallized glass of the invention has excellent heat resistance and mechanical strength, has high strength such that it is able to withstand high-speed rotation and drop impact and is able to realize heat expansion properties and chemical durability in agreement with respective drive members.

Especially, lithium disilicate has an effect for strengthening the mechanical strength such as Young' modulus and Vickers hardness, and therefore, it is preferable that the crystallized glass of the invention contains lithium disilicate as an essential component.

The "solid solution" as referred to herein refers to one in which in each of crystals of α-quartz (α-$SiO_2$) and β-quartz (β—$SiO_2$), a part thereof is substituted with an element other than the elements constituting the crystal, or an atom invades between the crystals. In particular, the β-quartz solid solution is expressed by the chemical formula: $Li_xAl_xSi_{1-x}O_2$ (0<x<1) and is a generic name including those in which other element is further substituted or invades.

Next, each of the composition components constituting the crystallized glass of the invention is described. The content of each of the components is expressed in terms of % by mass on the oxide basis. On the assumption that oxides, nitrates and the like which are used as a raw material of the constitutional components of the crystallized glass of the invention are all decomposed and converted into oxides at the time of melting, the terms "on the oxide basis" as referred to herein are concerned with a method for expressing a composition of each of the components to be contained in the crystallize glass and express the amount of each of the components to be contained in the crystallized glass relative to 100% by mass of the total sum of the mass of this formed oxide.

An $SiO_2$ component is an essential component for depositing the foregoing crystal as a main crystal phase by a heat treatment of a raw glass. When its amount is less than 60%, the deposited crystal of the obtained crystallized glass is instable and easy to enlarge in a tissue. As a result, the mechanical strength is lowered, and the surface roughness obtained upon polishing is easy to become large. Therefore, a lower limit of the content of the $SiO_2$ component is preferably 60%, more preferably 62%, and most preferably 64%. Also, when the content of the $SiO_2$ component exceeds 78%, dissolution and molding are easy to become difficult, and as a result, the uniformity is easily lowered. Therefore, an upper limit of the content of the $SiO_2$ component is preferably 78%, more preferably 77%, and most preferably 76%.

In order to realize low viscosity of the glass, a method for containing a large amount of an alkali component is frequently employed. According to this method, deterioration in chemical durability to be caused due to an increase of elution of the alkali component from the glass is problematic. Therefore, there is a method for containing a large amount of an alkaline earth component or a ZnO component as an alternative measure. Examples of a component capable of containing the alkaline earth component include MaO, CaO, BaO and SrO components. However, as a result of studies, the present inventor has found that in the crystallized glass containing an $SiO_2$ component and an $Li_2O$ component and containing the foregoing crystal phase, with respect to each of the ZnO, MgO and CaO components, following an increase of these contents, solid solution easily occurs so that desired physical properties are not obtainable, or a state that vitrification is difficult is caused; however, so far as the content of each of the BaO and SrO components falls within a specified range, even when it is increased, it is possible to realize low viscosity while keeping the desired crystal phase. Also, since all of the SrO component and the BaO component contribute to realization of low viscosity of a molten glass and refinement of a deposited crystal, in order to obtain this effect and the effect to be brought by the foregoing knowledge, the total sum of at least one member selected from the SrO component and the BaO component is preferably more than 3.5%, more preferably 3.6% or more and most preferably 3.7% or more.

Also, the SrO component and the BaO component are a component which even when contained in a large amount in the glass component, hardly causes enlargement of a deposited crystal or solid solution. On the other hand, since the specific gravity tends to increase, for the purposes of regulating the specific gravity at an appropriate value and obtaining the effect to be brought by the foregoing knowledge, the total sum of at least one member selected from the SrO component and the BaO component is preferably not more than 15%, more preferably not more than 14%, and most preferably not more than 13%.

Also, as described previously, the SrO component is contained interpolatively with the BaO component. However, for the purpose of achieving low viscosity of a molten glass and refinement of a deposited crystal, the content of the SrO component is preferably 2.5% or more, and most preferably 3.5% or more. Also, for the purpose of regulating the specific gravity at an appropriate value, an upper limit of the SrO component is preferably not more than 15%, more preferably not more than 14%, and most preferably not more than 13%.

As described previously, the BaO component is contained interpolatively with the SrO component. However, for the purpose of achieving low viscosity of a molten glass and refinement of a deposited crystal, the content of the BaO component is preferably 2.5% or more, and most preferably 3.5% or more. Also, for the purpose of regulating the specific gravity at an appropriate value, an upper limit of the BaO component is preferably not more than 15%, more preferably not more than 14%, and most preferably not more than 13%.

An $Li_2O$ component is a component which constitutes the foregoing crystal phase and is contained as an essential component. The $Li_2O$ component is an important component contributing to realization of low viscosity of the glass. When its amount is less than 5%, its effect is hardly obtainable. Therefore, a lower limit of the $Li_2O$ component is preferably 5%, more preferably 5.5%, and most preferably 6%. Also, when the content of the $Li_2O$ component exceeds 10%, deterioration in chemical durability becomes noticeable. Therefore, an upper limit of the content of the $Li_2O$ component is preferably 10%, more preferably 9%, and most preferably 8.5%.

A $K_2O$ component is effective for achieving refinement of the crystal particle and realizing low viscosity of the glass, and therefore, it can be added as an arbitrary component. When the content of this component exceeds 3%, vitrification is difficult so that a desired crystal phase is hardly obtainable. Therefore, an upper limit of the content of the $K_2O$ component is preferably 3%, more preferably 2.5%, and further preferably 2%.

An $Na_2O$ component is effective for realizing low viscosity of the glass, and therefore, it can be added as an arbitrary component. When the content of this component exceeds 3%, vitrification is difficult so that a desired crystal phase is hardly obtainable. Therefore, an upper limit of the content of the $Na_2O$ component is preferably 3%, more preferably 2.5%, and further preferably 2%.

For the purpose of making the elution amount of the alkali component low, the total sum of the $Li_2O$ component to be contained as an essential component and at least one member of the $Na_2O$ component and the $K_2O$ component to be contained as the need arises is preferably not more than 14%, more preferably not more than 12%, and most preferably not more than 11%. Also, for the purpose of making it easy to reduce the viscosity of the glass, the total sum of the $Li_2O$ component and at least one member of the $Na_2O$ component and the $K_2O$ component to be contained as the need arises is preferably 5% or more, more preferably 6% or more, and most preferably 7% or more.

A $P_2O_5$ component can be added as a nucleating agent, contributes to realization of low viscosity and enhances melting and clarity of the raw glass due to the coexistence with $SiO_2$. Therefore, for the purpose of obtaining these effects surely and sufficiently, a lower content of the content of the $P_2O_5$ component is preferably 1.5%, more preferably 1.6%, and most preferably 1.7%. However, when the addition amount of this component exceeds 3%, vitrification is difficult, and devitrification is easy to occur. Therefore, an upper limit of the content of the $P_2O_5$ content is preferably 3%, more preferably 2.9%, and most preferably 2.8%.

Similar to $SiO_2$, an $Al_2O_3$ component is a component which constitutes the foregoing crystal phase and is also an important component which contributes to stabilization and an enhancement of chemical durability of the glass. However, when its amount is less than 4%, vitrification is difficult. Therefore, a lower limit of the content of the $Al_2O_3$ component is preferably 4%, more preferably 4.5%, and most preferably 5%. Also, when the content of the $Al_2O_3$ component exceeds 10%, dissolution, moldability and resistance to devitrification are rather deteriorated, and as a result, the uniformity is easily lowered. Therefore, an upper limit of the content of the $Al_2O_3$ component is preferably 10%, more preferably 9.5%, and most preferably 9%.

MaO, CaO and ZnO components are effective for realization of low viscosity of a glass and refinement of a deposited crystal phase, and therefore, they can be added as an arbitrary component. However, as described previously, when the content of MgO exceeds 2%, the content of CaO exceeds 2%, or the content of ZnO exceeds 3%, the deposited crystal is instable, and its tissue is easy enlarge, whereby a desired crystal phase is hardly obtainable. Also, the raw glass is easy to devitrify. Accordingly, an upper limit of each of these components is preferably 2% for MgO, 2% for CaO and 3% for ZnO, respectively, more preferably 1.6% for MgO, 1.6% for CaO and 2.4% for ZnO, respectively, and further preferably 1.2% for MgO, 1.2% for CaO and 1.8% for ZnO, respectively.

A $ZrO_2$ component can be added as a nucleating agent. This component largely contributes to an enhancement of chemical durability and an enhancement of physical properties of a glass and is also effective for obtaining a fine crystal. Therefore, in order to easily obtain this effect, the addition amount of the $ZrO_2$ component is preferably 1% or more, more preferably 1.2% or more, and most preferably 1.4% or more. However, when the addition amount of this component exceeds 10%, the component remains without being completely dissolved, thereby easily generating $ZrSiO_4$ (zircon). Therefore, an upper limit of the content of the $ZrO_2$ component is preferably 10%, more preferably 8%, and most preferably 6%.

$Gd_2O_3$, $La_2O_3$, $Y_2O_3$ and $Ga_2O_3$ components are effective for realizing low viscosity of a glass, enhancing mechanical properties due to an enhancement of Young's modulus and raising a crystallization treatment temperature, namely enhancing heat resistance, and therefore, they can be added as an arbitrary component. With respect to the amount of each of these components, it is sufficient that the total sum of at least one member of these components is up to 15%. When the total sum exceeds 15%, vitrification and crystallization are hardly achieved. Accordingly, an upper limit of the total sum of these components is preferably 15%, more preferably 10%, and most preferably 8%.

An $Sb_2O_3$ component is effective as a defoaming agent, and therefore, it can be added as an arbitrary component. The content of the $Sb_2O_3$ component is sufficiently up to 2%, more preferably up to 1.5%, and most preferably up to 1%.

An $As_2O_3$ component is a component which can become harmful in the environment, and its use amount should be made low as far as possible. Even when the crystallized glass of the invention does not contain an $As_2O_3$ component, a clarification effect can be obtained. Therefore, in order to reduce influences against the environment, it is preferable that the $As_2O_3$ component is not contained.

A $B_2O_3$ component contributes to realization of low viscosity of a glass and enhances dissolution and moldability, and therefore, it can be added as an arbitrary component within the range where properties of the crystallized glass are not hindered. However, when the content of this component exceeds 5%, the raw glass is easy to cause phase separation, whereby a desired crystal phase is hardly obtainable. Therefore, an upper limit of the content of the $B_2O_3$ component is preferably 5%, more preferably 4%, and further preferably 3%.

A $TiO_2$ component can be arbitrarily added as a nucleating agent. However, when the addition amount of this component exceeds 5%, not only a desired crystal phase is hardly obtainable, but there may be the case where after crystallization, a $TiO_2$ phase is deposited as a crystallization phase. Therefore, an upper limit of the content of the $TiO_2$ component is preferably 5%, more preferably 4%, and most preferably 3%.

With respect to the elution amount of the alkali component, when the elution amount per unit area exceeds 0.016 $\mu g/cm^2$, a lowering of magnetic properties to be caused due to diffusion of an alkali at the time of fabrication of a recording medium or a read error or head crush due to the formation of a compound by the alkali component which has been diffused into the surface of a recording medium is easily caused. Therefore, the elution amount per unit area [$\mu g/cm^2$] of the alkali component of the crystallized glass of the invention is preferably not more than 0.016, more preferably not more than 0.014, and most preferably not more than 0.012.

Here, the elution amount of an alkali ion was measured by ion chromatography. That is, in a film pack, 80 mL of ultrapure water (room temperature) and a disk-shaped crystallized glass (about 65 mm in diameter×0.635 mm) were packed; thereafter, the film pack was kept in a dryer kept at about 30° C. for 3 hours; the disk was then taken out; the total amount of an alkali ion obtained at the time of ion chromatographic measurement was determined; and this value was divided by a surface area of the disk, thereby defining the obtained value as an elution amount per unit volume of an alkali metal ion [$\mu g/cm^2$].

Next, the average particle size of the crystal phase of the crystallized glass of the invention is described. The foregoing average crystal particle size affects surface properties after processing into a substrate and polishing the surface. As described previously, following an enhancement of the areal recording density of an information recording medium, in recent years, the flying height of a magnetic head is not more than 15 nm. The flying height will become not more than 10 nm in the future and be advanced toward the direction of a near contact recording system or a contact recording system in a completely contacted state. In order to adapt with this matter, the smoothness of the surface of a substrate such as a disk substrate must be better than that of existing goods.

According to the smoothness on an existing level, even when it is intended to perform input and output with high density in a magnetic recording medium, since a distance between the head and the medium is large, input and output of a magnetic signal cannot be performed. Also, when this distance is made small, a projection of the medium (disk substrate) and the head collide with each other, thereby causing breakage of the head or breakage of the medium. Accordingly, in order that breakage of the head or breakage of the disk substrate may not be caused even in this remarkably low flying height or in a contact state and that adsorption between the head and the medium may not occur, an upper limit of the surface roughness Ra (arithmetic average roughness) is 2 angstroms.

Then, for the purpose of making it easy to obtain such a smooth polished surface, an upper limit of the average particle size of the crystal particle of the crystallized glass is preferably not more than 100 nm, more preferably not more than 70 nm, and most preferably not more than 50 nm. Also, for the purpose of make the mechanical strength and heat resistance satisfactory, a lower limit of the average particle size of the crystal particle of the crystallized glass is preferably 1 nm.

In the crystallized glass of the invention, by uniformly depositing a fine crystal particle, it is possible to devise to enhance the mechanical strength. In particular, since the deposited crystal particle prevents the growth of a fine crack, it is possible to remarkably reduce a fine defect to be caused due to chipping at the time of polishing or the like.

Also, by uniformly depositing such a fine particle and forming a compression stress layer on the surface, it is possible to tremendously enhance the mechanical strength, especially ring flexural strength of the crystallized glass. From these viewpoints, it is preferable that the range of the average particle size of the crystal particle falls within the foregoing range.

For that reason, for example, in the case where the crystallized glass of the invention is a substrate such as a disk substrate for magnetic recording medium, the areal recording density can be made large; and for the purpose of enhancing the recording density, even when the substrate itself is made adaptive with high-speed rotation, flexion or deformation is not generated, and vibration due to this rotation is reduced, whereby the number of data read errors (TMR) to be caused due to flexion can be lowered. In addition, since the crystallized glass of the invention is excellent in impact properties, it hardly causes head crush or breakage of a substrate as the information recording medium especially for a mobile application or the like, and as a result, it exhibits excellent stable operating properties.

The "average particle size of crystal particle" as referred to herein refers to a median cumulative value ("median diameter", d50) of particle sizes on an area basis of crystal images (n=100) measured by a transmission electron microscope (TEM). The particle size means a value when a distance between two parallel straight lines which interpose the obtained crystal image therebetween becomes the maximum. Also, the "ring flexural strength" as referred to herein refers to a flexural strength measured by a concentric circle flexural method by preparing a thin disk-shaped sample having a diameter of 65 mm and a thickness of 0.635 mm and measuring a strength of the disk-shaped sample by a circular supporting ring and a load ring.

Next, the Young's modulus and the specific gravity are described. As described previously, for the purpose of enhancing the recording density and data transfer rate, a tendency toward high-speed rotation of the information recording medium disk substrate is advanced. In order to adapt with this tendency, in order to prevent disk vibration to be caused due to flexion at the time of high-speed rotation, the substrate material must be high in stiffness and low in specific gravity. Also, in case of contact with a head or in case of use in a portable recoding unit such as removable recording units, it is preferable that the substrate has mechanical strength, high Young's modulus and surface hardness such that the substrate sufficiently withstands it. Specifically, the Young's modulus is preferably 85 GPa or more, more preferably 88 GPa or more, and most preferably 90 GPa or more.

However, even when the stiffness is merely high, if the specific gravity is high, flexion is generated at the time of high-speed rotation because of its large weight, and vibration is generated. Conversely, even when the specific gravity is low, if the stiffness is low, vibration is similarly generated. Also, when the specific gravity is too low, it is consequently difficult to obtain desired mechanical strength. Accordingly, a balance in properties between high stiffness and low specific gravity, the both of which are contradictory to each other at a glance, must be taken. A ratio of the Young's modulus [GPa] to the specific gravity is preferably in the range of 32 or more, more preferably in the range of 33 or more, and most preferably in the range of 34 or more. Also, even when the stiffness is high, the specific gravity is required to be not more than 2.7. However, when the specific gravity is less than 2.2, a substrate having desired stiffness is substantially hardly obtainable.

Also, with respect to the average coefficient of linear expansion, for the purpose of making matching of the average coefficient of linear expansion with respective constitutional parts of a hard disk satisfactory, a lower limit of the average coefficient of linear expansion in a temperature range of from 25° C. to 100° C. is preferably 50 $[10^{-7\circ} C.^{-1}]$ or more, more preferably 52 $[10^{-7\circ} C.^{-1}]$ or more, and most preferably 55 $[10^{-7\circ} C.^{-1}]$ or more. For the same reason, an upper limit of the average coefficient of linear expansion is preferably not more than 120 $[10^{-7\circ} C.^{-1}]$, more preferably not more than 110 $[10^{-7\circ} C.^{-1}]$, and most preferably not more than 100 $[10^{-7\circ} C.^{-1}]$.

In view of the matter that the crystallized glass of the invention has the foregoing average coefficient of linear expansion, it can also be favorably used as applications such as various precision members which are required to have thermal dimensional stability.

Next, the viscosity is described. In molding the crystallized glass of the invention in a prescribed shape (for example, a disk shape having an outer diameter of 68 mm and a thickness of 1.0 mm) by, for example, press molding, when the viscosity of the molten glass is too high, it is difficult to obtain a shape having prescribed thickness and outer diameter (the thickness becomes large, whereas the outer diameter becomes small). Therefore, an upper limit value of a logarithm log η of a viscosity η [dPa·s] of a molten glass when heated at 1,400° C. is preferably 2.40, more preferably 2.38, and most preferably 2.35. On the other hand, when the viscosity is too low, it is very difficult to regulate the flow rate of the glass in conformity with the weight of a glass necessary for obtaining a prescribed shape and to achieve shear cutting. Therefore, a lower limit of log η is preferably 1.6, more preferably 1.8, and most preferably 2.0.

Here, the logarithm log η of a viscosity η [dPa·s] of a molten glass when heated at 1,400° C. can be determined by using a sphere pull up viscometer (BVM-13LH, manufactured by OPT Corporation).

In the crystallized glass of the invention, by providing a compression stress layer on the surface, an effect for more enhancing the mechanical strength which the crystallized glass before providing the compression stress layer has is obtainable.

As a method for forming the compression stress layer, there is, for example, a chemical strengthening method for achieving an exchange reaction with an alkali component having an ion radius larger than an alkali component existing in the surface layer of the crystallized glass before forming the compression stress layer. Also, there are a thermal tempering method in which the crystallized glass is heated and then quenched; and an ion injection method in which an ion is injected into the surface layer of the crystallized glass.

As to the chemical strengthening method, for example, the crystallized glass is dipped in a molten salt of a salt containing potassium and/or sodium, for example, potassium nitrate ($KNO_3$) or sodium nitrate ($NaNO_3$) or a composite salt thereof at a temperature of from 300 to 600° C. for from 0.5 to 12 hours. According to this, an exchange reaction with the potassium component which is an alkali component having a larger ion radius than the sodium component ($Na^+$ ion) existing in the glass component is advanced due to an exchange reaction of the lithium component ($Li^+$ ion) existing in the residual glass component in the crystallized glass with the sodium component ($Na^+$ ion) and/or the potassium component ($K^+$ ion) which is an alkali component having a larger ion radius than Li and an exchange reaction with the residual glass component and/or the lithium compound ($Li^+$ ion), whereby an increase in volume of the crystallized glass occurs, and a compression stress is generated in the surface layer of the crystallized glass. As a result, the ring flexural strength as an index of impact properties increases.

The thermal tempering method is not particularly limited. For example, by heating the crystallized glass at from 300° C. to 600° C. and then carrying out rapid cooling such as water cooling and/or air cooling, the compression stress layer generated due to a temperature difference between the surface and the interior of the glass can also be formed. By combining with the foregoing chemical treatment method, the compression stress layer can be more effectively formed.

In manufacturing the crystallized glass of the invention, a nucleation step of melting and quenching a glass raw material containing the foregoing respective components to prepare a raw glass and heat treating this raw material at from 500° C. to 650° C. is carried out, and after this nucleation step, a crystal growth step of performing a heat treatment at a temperature higher than that of the nucleation step and ranging from 600° C. to 850° C. is carried out.

Also, in order to prepare the substrate for information recording medium, the manufacture may be carried out by dropping the molten glass prepared under the foregoing condition in a female mold and pressed by male and female molds to mold in a disk shape, followed by shape processing and lapping processing and polishing processing by known methods as the need arises.

EXAMPLES

The invention is hereunder described with reference to the following preferred Examples, but it should not be construed that the invention is limited to these Examples.

Tables 1 to 5 show composition examples of crystallized glasses of Examples (Nos. 1 to 19) and Comparative Examples (Nos. 1 to 3) regarding the crystallized glass of the invention and nucleation temperature (unit: ° C.), crystal growth temperature (unit: ° C.), crystal phase, average crystal particle size (unit: nm), specific gravity, Young's modulus, value of (Young's modulus)/(specific gravity) (expressed as "E/ρ" in the item of each table), average coefficient of linear expansion (temperature range: from 25° C. to 100° C., unit: $10^{-7\circ} C.^{-1}$, expressed as "CTE (25-100)" in the item of each table), ring flexural strength (unit: MPa), elution amount of alkali component (unit: μg/cm$^2$) and surface roughness Ra after polishing (unit: nm) of each of these crystallized glasses.

TABLE 1

| Component (% by mass) | Example 1 | Example 2 | Example 3 | Example 4 | Example 5 |
| --- | --- | --- | --- | --- | --- |
| $SiO_2$ | 73.80 | 72.00 | 74.20 | 73.80 | 70.50 |
| $P_2O_5$ | 2.00 | 2.00 | 2.00 | 2.00 | 2.00 |
| $Al_2O_3$ | 6.50 | 6.50 | 6.50 | 6.50 | 6.50 |
| $B_2O_3$ | 0.00 | 0.00 | 0.00 | 0.00 | 0.00 |

TABLE 1-continued

| Component (% by mass) | Example 1 | Example 2 | Example 3 | Example 4 | Example 5 |
|---|---|---|---|---|---|
| $Li_2O$ | 8.50 | 7.50 | 8.00 | 8.00 | 8.50 |
| $K_2O$ | 1.50 | 1.50 | 1.50 | 1.00 | 1.50 |
| $Na_2O$ | 0.00 | 0.00 | 0.00 | 0.50 | 0.00 |
| MgO | 0.80 | 0.80 | 0.80 | 0.80 | 0.80 |
| CaO | 0.00 | 0.00 | 0.00 | 0.00 | 0.00 |
| BaO | 3.70 | 4.50 | 3.80 | 3.70 | 5.50 |
| SrO | 0.00 | 0.00 | 0.00 | 0.00 | 0.00 |
| ZnO | 0.50 | 0.50 | 0.50 | 0.50 | 0.50 |
| $ZrO_2$ | 2.50 | 2.50 | 2.50 | 3.00 | 4.00 |
| $TiO_2$ | 0.00 | 0.00 | 0.00 | 0.00 | 0.00 |
| $Sb_2O_3$ | 0.20 | 0.20 | 0.20 | 0.20 | 0.20 |
| Total | 100.00 | 100.00 | 100.00 | 100.00 | 100.00 |
| $Li_2O + K_2O + Na_2O$ | 10.00 | 9.00 | 9.50 | 9.50 | 10.00 |
| BaO + SrO | 3.70 | 4.50 | 3.80 | 3.70 | 5.50 |
| Nucleation temperature | 540 | 540 | 540 | 540 | 540 |
| Crystal growth temperature | 690 | 700 | 690 | 680 | 690 |
| Deposited crystal phase | Lithium disilicate α-Quartz β-Quarts solid solution α-Cristobalite | Lithium disilicate α-Quartz β-Quarts solid solution α-Cristobalite | Lithium disilicate α-Quartz β-Quarts solid solution α-Cristobalite | Lithium disilicate β-Quarts solid solution α--Cristobalite | Lithium disilicate β-Quarts solid solution |
| Average crystal particle size | 30 | 50 | 30 | 30 | 30 |
| Specific gravity | 2.51 | 2.56 | 2.50 | 2.51 | 2.57 |
| Young's modulus | 99 | 96 | 98 | 98 | 97 |
| E/p | 39.5 | 37.5 | 39.1 | 39.1 | 37.7 |
| CTE (25-100) | 62 | 78 | 66 | 67 | 60 |
| Ring flexural strength (MPa) | 700 | 550 | 680 | 670 | 690 |
| Elution amount of alkali component ($\mu g/cm^2$) | 0.009 | 0.006 | 0.007 | 0.008 | 0.010 |
| Surface roughness after polishing Ra (nm) | 0.18 | 0.16 | 0.18 | 0.17 | 0.16 |

TABLE 2

| Component (% by mass) | Example 6 | Example 7 | Example 8 | Example 9 | Example 10 |
|---|---|---|---|---|---|
| $SiO_2$ | 70.50 | 66.50 | 66.80 | 68.50 | 70.50 |
| $P_2O_5$ | 2.00 | 2.50 | 2.00 | 2.00 | 2.00 |
| $Al_2O_3$ | 6.50 | 6.50 | 6.50 | 6.50 | 6.50 |
| $B_2O_3$ | 0.00 | 0.00 | 0.00 | 0.00 | 0.00 |
| $Li_2O$ | 8.50 | 7.50 | 7.70 | 8.00 | 8.50 |
| $K_2O$ | 1.50 | 1.50 | 1.50 | 1.50 | 1.50 |
| $Na_2O$ | 0.00 | 0.00 | 0.00 | 0.00 | 0.00 |
| MgO | 0.80 | 0.80 | 0.80 | 0.80 | 0.80 |
| CaO | 0.00 | 0.00 | 0.00 | 0.00 | 0.00 |
| BaO | 5.50 | 10.00 | 10.00 | 8.00 | 0.00 |
| SrO | 0.00 | 0.00 | 0.00 | 0.00 | 5.50 |
| ZnO | 0.50 | 0.50 | 0.50 | 0.50 | 0.50 |
| $ZrO_2$ | 4.00 | 4.00 | 4.00 | 4.00 | 4.00 |
| $TiO_2$ | 0.00 | 0.00 | 0.00 | 0.00 | 0.00 |
| $Sb_2O_3$ | 0.20 | 0.20 | 0.20 | 0.20 | 0.20 |
| Total | 100.00 | 100.00 | 100.00 | 100.00 | 100.00 |
| $Li_2O + K_2O + Na_2O$ | 10.00 | 9.00 | 9.20 | 9.50 | 10.00 |
| BaO + SrO | 5.50 | 10.00 | 10.00 | 8.00 | 5.50 |
| Nucleation temperature | 540 | 540 | 540 | 540 | 540 |
| Crystal growth temperature | 740 | 690 | 700 | 720 | 700 |
| Deposited crystal phase | Lithium disilicate β-Quarts solid solution α-Cristobalite | Lithium disilicate β-Quarts solid solution | Lithium disilicate | Lithium disilicate β-Quarts solid solution α-Cristobalite | Lithium disilicate α-Quartz β-Quarts solid solution |
| Average crystal particle size | 50 | 30 | 20 | 30 | 40 |
| Specific gravity | 2.58 | 2.65 | 2.65 | 2.61 | 2.57 |

TABLE 2-continued

| Component (% by mass) | Example 6 | Example 7 | Example 8 | Example 9 | Example 10 |
|---|---|---|---|---|---|
| Young's modulus | 96 | 95 | 92 | 94 | 100 |
| E/p | 37.2 | 35.8 | 34.7 | 36.0 | 38.9 |
| CTE (25-100) | 86 | 62 | 62 | 66 | 64 |
| Ring flexural strength (MPa) | 620 | 550 | 560 | 600 | 750 |
| Elution amount of alkali component ($\mu g/cm^2$) | 0.010 | 0.009 | 0.008 | 0.010 | 0.008 |
| Surface roughness after polishing Ra (nm) | 0.17 | 0.15 | 0.13 | 0.17 | 0.18 |

TABLE 3

| Component (% by mass) | Example 11 | Example 12 | Example 13 | Example 14 | Example 15 |
|---|---|---|---|---|---|
| $SiO_2$ | 66.50 | 66.50 | 66.00 | 66.00 | 74.20 |
| $P_2O_5$ | 2.50 | 2.00 | 2.00 | 2.00 | 2.00 |
| $Al_2O_3$ | 6.50 | 6.50 | 6.50 | 6.50 | 6.50 |
| $B_2O_3$ | 0.00 | 0.00 | 0.00 | 0.00 | 0.00 |
| $Li_2O$ | 7.50 | 8.50 | 8.00 | 8.00 | 8.00 |
| $K_2O$ | 1.50 | 1.50 | 1.50 | 1.50 | 1.50 |
| $Na_2O$ | 0.00 | 0.00 | 0.00 | 0.00 | 0.00 |
| MgO | 0.80 | 0.80 | 0.80 | 0.80 | 0.00 |
| CaO | 0.00 | 0.00 | 0.00 | 0.00 | 0.80 |
| BaO | 0.00 | 4.50 | 5.50 | 5.50 | 3.80 |
| SrO | 10.00 | 0.00 | 0.00 | 0.00 | 0.00 |
| ZnO | 0.50 | 0.50 | 0.50 | 0.50 | 0.50 |
| $ZrO_2$ | 4.00 | 4.00 | 4.00 | 4.00 | 2.50 |
| $TiO_2$ | 0.00 | 0.00 | 0.00 | 0.00 | 0.00 |
| Others | 0.00 | $La_2O_3$: 5.00 | $Gd_2O_3$: 5.00 | $Ga_2O_3$: 5.00 | 0.00 |
| $Sb_2O_3$ | 0.20 | 0.20 | 0.20 | 0.20 | 0.20 |
| Total | 100.00 | 100.00 | 100.00 | 100.00 | 100.00 |
| $Li_2O + K_2O + Na_2O$ | 9.00 | 10.00 | 9.50 | 9.50 | 9.50 |
| BaO + SrO | 10.00 | 4.50 | 5.50 | 5.50 | 3.80 |
| Nucleation temperature | 540 | 540 | 540 | 540 | 540 |
| Crystal growth temperature | 680 | 690 | 690 | 690 | 690 |
| Deposited crystal phase | Lithium disilicate α-Quartz β-Quarts solid solution | Lithium disilicate α-Quartz β-Quarts solid solution α-Cristobalite | Lithium disilicate α-Quartz β-Quarts solid solution α-Cristobalite | Lithium disilicate α-Quartz β-Quarts solid solution α-Cristobalite | Lithium disilicate α-Quartz β-Quarts solid solution α-Cristobalite |
| Average crystal particle size | 30 | 40 | 40 | 50 | 30 |
| Specific gravity | 2.64 | 2.66 | 2.68 | 2.62 | 2.50 |
| Young's modulus | 97 | 100 | 100 | 101 | 97 |
| E/p | 36.8 | 37.6 | 37.4 | 38.6 | 38.8 |
| CTE (25-100) | 71 | 66 | 64 | 73 | 64 |
| Ring flexural strength (MPa) | 680 | 680 | 700 | 720 | 580 |
| Elution amount of alkali component ($\mu g/cm^2$) | 0.007 | 0.011 | 0.011 | 0.011 | 0.008 |
| Surface roughness after polishing Ra (nm) | 0.16 | 0.16 | 0.15 | 0.18 | 0.17 |

TABLE 4

| Component (% by mass) | Example 16 | Example 17 | Example 18 | Example 19 |
|---|---|---|---|---|
| $SiO_2$ | 67.20 | 66.80 | 67.00 | 66.50 |
| $P_2O_5$ | 2.00 | 2.00 | 2.50 | 2.50 |
| $Al_2O_3$ | 7.00 | 7.00 | 6.50 | 6.60 |
| $B_2O_3$ | 0.00 | 1.00 | 0.00 | 0.00 |
| $Li_2O$ | 7.80 | 7.50 | 7.50 | 7.50 |
| $K_2O$ | 1.50 | 1.50 | 1.50 | 1.50 |
| $Na_2O$ | 0.00 | 0.00 | 0.00 | 0.00 |
| MgO | 0.00 | 0.50 | 0.80 | 0.80 |
| CaO | 0.80 | 0.50 | 0.00 | 0.00 |
| BaO | 10.00 | 10.00 | 10.00 | 10.00 |
| SrO | 0.00 | 0.00 | 0.00 | 0.00 |
| ZnO | 0.50 | 0.50 | 0.00 | 0.50 |
| $ZrO_2$ | 2.00 | 1.50 | 4.00 | 3.90 |
| $TiO_2$ | 1.00 | 1.00 | 0.00 | 0.00 |
| $Sb_2O_3$ | 0.20 | 0.20 | 0.20 | 0.20 |
| Total | 100.00 | 100.00 | 100.00 | 100.00 |
| $Li_2O + K_2O + Na_2O$ | 9.30 | 9.00 | 9.00 | 9.00 |
| BaO + SrO | 10.00 | 10.00 | 10.00 | 10.00 |
| Nucleation temperature | 540 | 540 | 540 | 540 |
| Crystal growth temperature | 690 | 690 | 690 | 680 |
| Deposited crystal phase | Lithium disilicate α-Quartz β-Quarts solid solution α-Cristobalite | Lithium disilicate α-Quartz β-Quarts solid solution α-Cristobalite | Lithium disilicate β-Quarts solid solution | Lithium disilicate β-Quarts solid solution Lithium monosilicate |
| Average crystal particle size | 50 | 50 | 40 | 30 |
| Specific gravity | 2.61 | 2.65 | 2.64 | 2.63 |
| Young's modulus | 97 | 98 | 95 | 93 |
| E/p | 36.5 | 36.6 | 36.0 | 35.4 |
| CTE (25-100) | 70 | 72 | 63 | 63 |
| Ring flexural strength (MPa) | 550 | 560 | 580 | 530 |
| Elution amount of alkali component (μg/cm²) | 0.010 | 0.009 | 0.009 | 0.012 |
| Surface roughness after polishing Ra (nm) | 0.18 | 0.19 | 0.18 | 0.15 |

TABLE 5

| Component (% by mass) | Comparative Example 1 | Comparative Example 2 | Comparative Example 3 |
|---|---|---|---|
| $SiO_2$ | 75.30 | 76.06 | 76.70 |
| $P_2O_5$ | 2.00 | 2.02 | 2.00 |
| $Al_2O_3$ | 7.00 | 7.07 | 7.10 |
| $B_2O_3$ | 0.00 | 0.00 | 0.00 |
| $Li_2O$ | 9.90 | 10.00 | 8.10 |
| $K_2O$ | 2.00 | 1.01 | 2.00 |
| $Na_2O$ | 0.00 | 0.00 | 0.00 |
| MgO | 0.80 | 0.81 | 0.80 |
| CaO | 0.00 | 0.00 | 0.00 |
| BaO | 0.00 | 0.00 | 0.00 |
| SrO | 0.00 | 0.00 | 0.00 |
| ZnO | 0.50 | 0.51 | 0.50 |
| $ZrO_2$ | 2.30 | 2.32 | 2.30 |
| $TiO_2$ | 0.00 | 0.00 | 0.00 |
| $Sb_2O_3$ | 0.20 | 0.20 | 0.50 |
| Total | 100.00 | 100.00 | 100.00 |
| $Li_2O + K_2O + Na_2O$ | 11.90 | 11.01 | 10.10 |
| BaO + SrO | 0.00 | 0.00 | 0.00 |
| Nucleation temperature | 540 | 540 | 540 |
| Crystal growth temperature | 730 | 690 | 730 |
| Deposited crystal phase | α-Quartz Lithium disilicate | α-Quartz Lithium disilicate | α-Quartz Lithium disilicate |
| Average crystal particle size | 150 | 30 | 50 |
| Specific gravity | 2.47 | 2.45 | 2.50 |
| Young's modulus | 102 | 96 | 98 |
| E/p | 41.3 | 39.2 | 39.2 |

TABLE 5-continued

| Component (% by mass) | Comparative Example 1 | Comparative Example 2 | Comparative Example 3 |
| --- | --- | --- | --- |
| CTE (25-100) | 85 | 74 | 86 |
| Ring flexural strength (MPa) | 600 | 440 | 580 |
| Elution amount of alkali component ($\mu g/cm^2$) | 0.027 | 0.035 | 0.012 |
| Surface roughness after polishing Ra (nm) | 0.28 | 0.17 | 0.19 |

Furthermore, in the foregoing Examples and Comparative Examples, with respect to the viscosity of the molten glass, a measured viscosity curve was determined by using a sphere pull up viscometer (BVM-13LH, manufactured by OPT Corporation). In comparison between the Examples of the invention and the Comparative Examples, all of the Examples of the invention and Comparative Example 1 have a logarithm log $\eta$ of a viscosity $\eta$ [dPa·s] when heated at 1,400° C. is not more than 2.4 and therefore, have satisfactory low-viscosity properties capable of adapting with press molding on a mass production level. On the other hand, Comparative Example 3 has a log $\eta$ of 2.46 and does not have sufficient low-viscosity properties. Also, in order to obtain the same viscosity, it is necessary to achieve heating at a temperature in the vicinity of 1,450° C., and therefore, it is noted that such is accompanied with an increase of mass production costs and deterioration of equipment life.

With respect to the glass of the foregoing Example 5 and the glass of Comparative Example 3, a press test was carried out. The temperature of a glass flowout nozzle was regulated such that the temperature of a glass gob reached 1,400° C., and the glass was dropped in a molding die (female mold) heated to a temperature in the vicinity of the glass transition temperature and pressed by male and female molds. In case of using the glass of Example 5, a desired glass disk of φ67 mm×1 mm in thickness was obtained. On the other hand, in case of using the glass of Comparative Example 3, the viscosity was high so that the glass did not sufficiently spread on the molding die. As a result, as compared with the desired shape (φ67 mm×1 mm in thickness), the outer diameter was small, and the thickness was large.

In all of the glasses of the foregoing Examples of the invention, raw materials including an oxide, a carbonate, a nitrate and the like were mixed, and the mixture was melted at a temperature of from about 1,400 to 1,500° C. by using a usual melting apparatus, stirred for homogenization and then molded in a disk shape, followed by cooling to obtain a glass molded article. Thereafter, the glass molded article was heat treated at from 500 to 650° C. for from about 1 to 12 hours to form a crystal nucleus; and thereafter, a crystal growth step was carried out by a heat treatment at a temperature higher than the crystal nucleus forming temperature within the range of from 600 to 850° C. for from about 1 to 12 hours, thereby obtaining the desired crystallized glass. Subsequently, the foregoing crystallized glass was lapped with an abrasive grain having an average grain size of from 5 to 30 μm for from about 10 minutes to 60 minutes, and after inner and outer diameter processing, the resulting crystallized glass was polished with cerium oxide having an average grain size of from 0.5 μm to 2 μm for from about 30 minutes to 60 minutes, thereby obtaining a substrate for information recording medium. At that time, the surface roughness Ra (arithmetic average roughness) of the substrate was all not more than 2 angstroms.

Example 20

Also, this substrate was dipped in potassium nitrate ($KNO_3$) at a temperature of from 300 to 600° C. for from 0.5 to 12 hours, thereby forming a compression stress layer on the surface. It was confirmed that the ring flexural strength of the resulting substrate was enhanced to from 1.5 times to 8 times that before forming the compression stress layer.

Example 21

Also, after heating at from 300° C. to 600° C., the substrate was rapidly cooled by an air cooling method, thereby forming a compression stress layer on the surface. It was confirmed that the ring flexural strength of the resulting substrate was enhanced.

Example 22

Also, a chromium alloy base layer and a cobalt alloy magnetic layer were formed by a DC sputtering method on each of the substrates obtained in the foregoing Examples; a diamond-like carbon layer was further formed thereon; and a perfluoropolyether based lubricant was subsequently coated, thereby obtaining an information magnetic recording medium.

Industrial Applicability

In substrates for magnetic recording medium to be used in various information magnetic recording units, especially perpendicular magnetic recording media, media for patterned media, discrete track media, etc., the invention provides a crystallized glass having a reduced content of an alkali metal for the purpose of suppressing a lowering of magnetic properties of a recording medium or reducing a defect to be caused due to alkali corrosion, having low viscosity properties adaptive with press molding on a mass production level, having an extremely smooth substrate surface adaptive with low flying height of a magnetic head, having high Young's modulus and low specific gravity properties and having excellent mechanical properties. The crystallized glass of the invention is useful as a substrate for information recording medium, especially as a substrate for perpendicular magnetic recording medium for HDD.

What is claimed is:

1. A crystallized glass containing a $SiO_2$ component and a $Li_2O$ component, comprising, in terms of % by mass on the oxide basis:
from 60 to 78% of $SiO_2$,
from 5 to 8.5% of $Li_2O$,
from 4 to 10% of $Al_2O_3$,
from 1.5 to 3% of $P_2O_5$,
from 0 to 2.4% of ZnO,
from 0 to 2% of MgO, and
from 3.6 to 15% in total of at least one member selected from a SrO component and a BaO component,
wherein a main crystal phase comprises lithium disilicate.

2. The crystallized glass according to claim 1, wherein the total amount of at least one member of a $Li_2O$ component, a $Na_2O$ component and a $K_2O$ component is from 5% to 14% in terms of % by mass on the oxide basis.

3. The crystallized glass according to claim 1, wherein when dipped in pure water kept at 30° C. for 3 hours, an elution amount of an alkali metal component is not more than 0.016 ($\mu g/cm^2$).

4. The crystallized glass according to claim 1, wherein an average coefficient of linear expansion in a temperature range of from 25° C. to 100° C. is from 50 to 120 ($10^{-7}$ $C.^{-1}$).

5. The crystallized glass according to claim 1, wherein the crystal phase has an average particle size of not more than 100 nm.

6. The crystallized glass according to claim 1, wherein a Young's modulus is 85 GPa or more.

7. The crystallized glass according to claim 1, further comprising:
from 0 to 2% of CaO,
from 0 to 3% of $K_2O$,
from 0 to 3% of $Na_2O$,
from 1 to 10% of $ZrO_2$,
from 0 to 15% in total of at least one member of a $Gd_2O_3$ component, a $La_2O_3$ component, a $Y_2O_3$ component and a $Ga_2O_3$ component, and
from 0 to 2% of a $Sb_2O_3$ component.

8. The crystallized glass according to claim 7, wherein the composition of the crystallized glass contains respective components of from 0 to 5% of $B_2O_3$ and/or from 0 to 5% of $TiO_2$ in terms of % by mass on the oxide basis.

9. The crystallized glass according to claim 1, wherein log $\eta$ (a logarithm of a viscosity $\eta$ (dPa·s)) of a molten glass when heated at 1,400° C. is not more than 2.4.

10. The crystallized glass according to claim 1, wherein the crystallized glass is included in a substrate for information recording medium.

11. A crystallized glass containing a $SiO_2$ component and a $Li_2O$ component, comprising, in terms of % by mass on the oxide basis:
from 60 to 78% of $SiO_2$,
from 5 to 8.5% of $Li_2O$,
from 4 to 10% of $Al_2O_3$,
from 1.5 to 3% of $P_2O_5$,
from 0 to 2.4% of ZnO,
from 0 to 2% of MgO, and
more than 3.6 and not more than 15% in total of at least one member selected from a SrO component and a BaO component,
wherein a main crystal phase comprises lithium disilicate,
wherein the crystallized glass is included in a substrate for information recording medium, and
wherein the crystallized glass has a compression stress layer on a surface.

12. The crystallized glass according to claim 11, wherein the compression stress layer is formed by substituting with an alkali metal component having a larger ion radius than an alkali metal component existing in the surface.

13. The crystallized glass according to claim 11, wherein the compression stress layer is formed by heating the surface of the crystallized glass and then quenching the crystallized glass.

14. The crystallized glass according to claim 10, wherein a surface roughness Ra (arithmetic average roughness) is not more than 2 angstroms.

15. The crystallized glass according to claim 1, wherein the main crystal phase further comprises at least one selected from lithium monosilicate, α-quartz, an α-quartz solid solution and a β-quartz solid solution.

* * * * *